(12) United States Patent
Marger et al.

(10) Patent No.: US 10,723,439 B2
(45) Date of Patent: Jul. 28, 2020

(54) HYDRAULIC ACTUATOR

(71) Applicant: Ratier-Figeac SAS, Figeac (FR)

(72) Inventors: Thibaut Marger, Béduer (FR);
François Pouly, Figeac (FR);
Jean-Christophe Labascoule, Faycelles (FR)

(73) Assignee: RATIER-FIGEAC SAS, Figeac (FR)

( * ) Notice: Subject to any disclaimer, the term of this patent is extended or adjusted under 35 U.S.C. 154(b) by 73 days.

(21) Appl. No.: 16/037,026

(22) Filed: Jul. 17, 2018

(65) Prior Publication Data

US 2019/0016442 A1    Jan. 17, 2019

(30) Foreign Application Priority Data

Jul. 17, 2017 (EP) .................................. 17305943

(51) Int. Cl.
| | | |
|---|---|---|
| B64C 11/38 | (2006.01) | |
| F01D 7/00 | (2006.01) | |
| F15B 15/26 | (2006.01) | |
| F15B 15/22 | (2006.01) | |

(52) U.S. Cl.
CPC ............ *B64C 11/38* (2013.01); *B64C 11/385* (2013.01); *F01D 7/00* (2013.01); *F15B 15/226* (2013.01); *F15B 15/26* (2013.01); *F05D 2260/79* (2013.01); *F15B 2215/30* (2013.01)

(58) Field of Classification Search
CPC ........ B64C 11/38; B64C 11/385; F15B 15/26; F15B 15/226; F15B 2215/30; F05D 2260/79; F05D 2260/76; F05D 2260/74
USPC ....................................................... 416/147
See application file for complete search history.

(56) References Cited

U.S. PATENT DOCUMENTS

| | | | | |
|---|---|---|---|---|
| 2,948,263 A | * | 8/1960 | Royer ................... | B64C 11/385 91/401 |
| 3,645,644 A | * | 2/1972 | Schwisow .............. | B63H 3/082 416/157 R |
| 5,141,399 A | * | 8/1992 | Duchesneau ........... | B64C 11/38 416/157 R |

(Continued)

FOREIGN PATENT DOCUMENTS

EP    0559990 A1    9/1993

OTHER PUBLICATIONS

Extended European Search Report for International Application No. 17305943.7 dated Sep. 19, 2017, 8 pages.

*Primary Examiner* — J. Todd Newton
(74) *Attorney, Agent, or Firm* — Cantor Colburn LLP

(57) ABSTRACT

An actuator is disclosed comprising: a moveable member; a first hydraulic chamber in contact with a first surface of the moveable member; a second hydraulic chamber in contact with a second, opposing surface of the moveable member; a movable locking mechanism coupled to a moveable wall of the second hydraulic chamber; and a resilient biasing member acting on the moveable wall of the second hydraulic chamber so as to bias the moveable wall and locking mechanism. The actuator is configured to selectively vary the pressure in the second hydraulic chamber so that the resilient biasing member is able to bias the moveable wall to move, thereby moving the locking mechanism to engage the moveable member so as to prevent the movement of the moveable member towards at least one of the first and second hydraulic chambers.

15 Claims, 4 Drawing Sheets

(56) References Cited

U.S. PATENT DOCUMENTS

| | | | | |
|---|---|---|---|---|
| 5,161,948 A | * | 11/1992 | Carvalho | B64C 11/325 |
| | | | | 416/154 |
| 2008/0247877 A1 | * | 10/2008 | Gallet | F01D 7/00 |
| | | | | 416/156 |
| 2015/0050149 A1 | * | 2/2015 | Perkinson | B64C 11/32 |
| | | | | 416/153 |
| 2019/0016442 A1 | * | 1/2019 | Marger | B64C 11/385 |

* cited by examiner

HYDRAULIC ACTUATOR

FOREIGN PRIORITY

This application claims priority to European Patent Application No. 17305943.7 filed Jul. 17, 2017, the entire contents of which is incorporated herein by reference.

FIELD

The present disclosure relates generally to hydraulic actuator systems and method of controlling such systems.

BACKGROUND

Known actuators comprise a moveable member, and two hydraulic chambers located on opposing sides of the moveable member, such that controlling the pressures within the chambers causes movement of the moveable member. When there is a difference in pressure between the two chambers, the moveable member will be moved.

US 2015/0050149 discloses a propeller pitchlock system including a mechanism for locking the movement of an actuator.

SUMMARY

The present disclosure provides an actuator comprising a moveable member, a first hydraulic chamber in contact with a first surface of the moveable member, a second hydraulic chamber in contact with a second, opposing surface of the moveable member, a movable locking mechanism coupled to a moveable wall of the second hydraulic chamber, and a resilient biasing member acting on the moveable wall of the second hydraulic chamber so as to bias the moveable wall and locking mechanism, wherein the actuator is configured to selectively vary the pressure in the second hydraulic chamber so that the resilient biasing member is able to bias the moveable wall to move, thereby moving the locking mechanism such that it engages the moveable member so as to prevent the movement of the moveable member towards at least one of the first and second hydraulic chambers. The movable wall may be on the opposing side of the second hydraulic chamber to the second, opposing surface of the moveable member.

The first hydraulic chamber may be arranged to contact the movable wall, such that the movable wall separates the first and second hydraulic chambers.

The resilient biasing member may be located inside the first hydraulic chamber.

The resilient biasing member may be located outside of the second hydraulic chamber.

The resilient biasing member may be a spring.

The actuator may comprise a stop member for preventing the resilient biasing member from being compressed by the movable wall to less than a predetermined length.

The movable locking mechanism may be located in the first hydraulic chamber and said moving the locking mechanism may move the locking mechanism into engagement with a wall of the first hydraulic chamber. The interaction between the locking mechanism and the wall may cause an engagement, such as a mechanical interaction, between the moveable member to the locking mechanism, preventing the movement of the moveable member towards at least one of the first and second hydraulic chambers.

The locking mechanism may be configured such that, when it engages with the moveable member so as to prevent movement of the moveable member towards at least one of the first and second chamber, it prevents the movement of the moveable member towards the first hydraulic chamber. It may continue to allow the movement of the moveable member towards the second hydraulic chamber.

The actuator may comprise a control system for controlling the pressure supplied to the first and second hydraulic chambers. The control system may comprise any suitable system or arrangement which may include, for example, an electro-hydraulic servovalve, various additional valves, a pump, and/or a hydraulic tank.

The control system may be configured to pressurise the first and second hydraulic chambers such that, in one mode, this moves the movable wall to compress the resilient biasing member and to move the locking mechanism to allow the movement of the moveable member The control system may be configured to pressurise the first and second hydraulic chambers such that, in one mode, the resilient biasing member is able to expand and move the locking mechanism such that it engages the moveable member so as to prevent the movement of the moveable member towards at least one of the first and second hydraulic chambers.

The control system may be configured to pressurise the first and second hydraulic chambers such that, in one mode, the pressurised first and second hydraulic chambers cause the movable member to move. The moveable member can be moved in a first direction and a second direction, wherein the second direction is opposite to the first direction. The first direction is towards the first hydraulic chamber, causing the volume of the first hydraulic chamber to decrease, and the volume of the second hydraulic chamber to increase. The second direction is towards the second hydraulic chamber, causing the volume of the second hydraulic chamber to decrease, and the volume of the first hydraulic chamber to increase. The movable member may be caused to move by applying a difference in forces in the first and second directions. The forces may be caused by a different between the pressures in the first and second hydraulic chambers, and may also be dependent on the surface area of the first and second hydraulic chambers acted on to provide the force to the moveable member.

The control system may be configured such that, in said one mode, the pressure in the second hydraulic chamber is not actively varied, i.e. remains substantially at supply pressure, and the pressure in the first hydraulic chamber is varied so as to cause the movable member to move.

The present disclosure also provides a propeller system comprising one or more propeller blades and the above described actuator, wherein the actuator is coupled to the one or more propeller blades such that movement of said movable member alters the pitch of the one or more propeller blades.

BRIEF DESCRIPTION OF DRAWINGS

Various embodiments will now be described, by way of example only, and with reference to the accompanying drawings in which.

DETAILED DESCRIPTION

Figure 1:
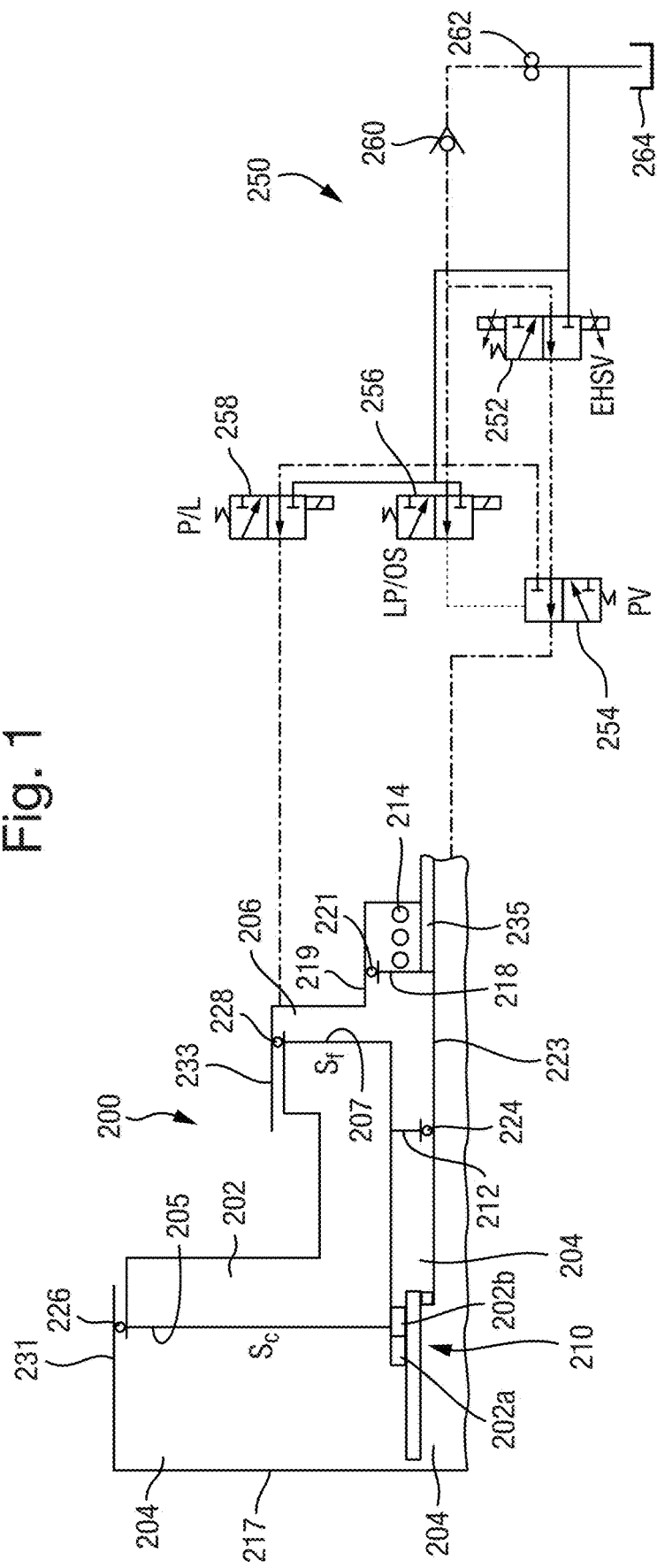
FIG. 1 shows an embodiment of an actuator in a "coarse" mode.

FIGS. 1-4 show an embodiment of an actuator 200 for controlling the movement of a movable member 202 in accordance with the present disclosure. In various embodiments, the movable member 202 is a piston yoke, although it is contemplated that the moveable member may form part of another actuator mechanism, such as any type of piston head. The movable member may be connected to any suitable system, such that controlled movement of the movable member 202 controls a movement in said system. For example, the moveable member 202 may be connected to a mechanism for controlling the pitch of one or more blades in an aircraft. However, it is contemplated that the actuator 200 may control other types of systems.

The actuator 200 comprises a first hydraulic chamber 204, a second hydraulic chamber 206, and a yoke 202 arranged between portions thereof. A first wall 205 of the first chamber 204 is one side of the yoke 202 and a first wall 207 of the second chamber 206 is the other side of the yoke 202. Therefore, the first and second chambers 204,206 are partially defined by the yoke 202. The first chamber 204 may be pressurised by a first fluid and the second chamber 206 may be pressurised by a second fluid, wherein the pressures in the chambers 204,206 may be controlled so as to move the position of the yoke 202 in a first direction towards the first hydraulic chamber 204 or in a second direction towards the second hydraulic chamber 206.

As described above, the pressure differential between the first chamber 204 and second chamber 206 may control the location of the yoke 202. The surface areas 205, 207 of the yoke 202 may be different. The force applied to yoke 202 by the chambers 204,206 is related to both these surface areas and the pressures in the chambers 204,206. For example, the pressures in the first and second chambers 204,206 may be the same, whilst still causing movement of the yoke 202, e.g. due to the surface area of the first surface 205 in contact with (or closing) the first chamber 204 being greater than the surface area 207 in contact with (or closing) the second chamber 206.

Since the first wall 205 of the first chamber 204 is one side of the yoke 202. The first wall 207 of the second chamber is the other side of the yolk, the walls 205, 207 move in unison. One end of each of the first walls 205,207 of the first and second chambers 204,206 may move along sealing walls 231,233 as the walls 205,207 (and yoke 202) move. These ends of the first walls 205,207 may be provided with seals 226 and 228 to enable the walls 205,207 to move relative to the sealing walls 231,233 without a significant volume of hydraulic fluid leaking out of the first and second chambers 204, 206.

As described above, the yoke 202 is arranged between the first and second chambers 204,206. The first chamber 204 may also extend around the second chamber 206 such that a second wall 218 of the second chamber 206, that is on an opposing side of the second chamber 206 to the first wall 207 of the second chamber 206, forms a wall separating the second chamber 206 from the first chamber 204. This second wall 218 is movable along a sealing wall 219 of the actuator and is provided with seal 221 to enable the second wall 218 to move along the sealing wall 219 without a significant volume of hydraulic fluid leaking between the first and second chambers 204,206.

The second wall 218 of the second chamber 206 is connected to a third wall 223 of the second chamber 206, which is in turn connected to a locking mechanism 210 for preventing the movement of the yoke 202 in at least one direction, i.e. towards at least one of the first and second hydraulic chambers 204,206. The connection is such that movement of the second wall 218 of the second chamber 206 creates a corresponding movement of the locking mechanism 210 relative to the second wall 217 of the first chamber 204. The locking mechanism 210 may be located in the first chamber 204 and be configured such that movement of the second wall 218 in one direction moves the locking mechanism 210 into contact with a second wall 217 of the first chamber 204. The locking mechanism may comprises two yoke members 202a, 202b. The locking mechanism may function in a similar manner to the mechanism disclosed in US 2015/0050149.

The mechanism 210 may also be configured such that movement of the second wall 207 of the second chamber 206 in the other direction moves the locking mechanism 210 out of contact with the second wall 217, and allows free movement of the yoke members 202a, 202b relative to the locking mechanism.

The actuator 200 also comprises a resilient biasing member 214 arranged for biasing the second wall 218 of the second chamber 206, and hence the locking mechanism 210, in the direction towards the second wall 217 of the first chamber 204. A stop member 235 may be provided for limiting the extent of the movement of the second wall 218 of the second chamber 206 in the other direction. The resilient biasing member 214 may be arranged in the portion of the first chamber 202 that acts on the second wall 218 of the second chamber 206. However, embodiments are contemplated wherein the first chamber 204 does not extend around to the second wall 218 of the second chamber 206. Accordingly, in such embodiments the resilient biasing member 214 is not located in the first chamber 204.

In the depicted embodiment the resilient biasing member is a spring 214. However, other resilient biasing members are contemplated, such as members formed of materials that are inherently resiliently biasing (e.g. elastic materials), rather than being resiliently biasing due to the structure into which they have been formed.

A wall 212 may extend from the yoke 202 to meet the third wall 223 of the second chamber 206, thereby defining a fourth wall 212 of the second chamber 206. The fourth wall 212 of the second chamber 206 is movable relative to the third wall 223 of the second chamber 206 and is provided with a seal 224 on its distal end to enable the relative movement without a significant volume of hydraulic fluid leaking past the fourth wall 212 of the second chamber 206. The fourth wall 212 may be a wall separating the first and second chambers 204,206.

The pressures in the first and second chambers 204,206 are controlled using a control system 250. The control system 250 may include an electro-hydraulic servovalve (EHSV) 252, a pitchlock valve (P/L) 258, a protection valve (PV) 254, a low pitch/overspeed valve (LP/OS) 256, a check valve 260, pump 262, and hydraulic tank 264. The pump 262 and the hydraulic tank may provide sources of relatively high and low pressures.

The P/L valve 258 may control the hydraulic fluid flow to and from the second chamber 206, and hence control the pressure therein. The PV 254 may control the hydraulic fluid flow to and from the first chamber 204, and hence control the pressure therein. In some modes, the PV 254 may be set to allow the EHSV 252 to control the pressure in the first chamber 204. However, as will be discussed below, in another ("feather") mode, the LP/OS 256 may cause the PV 254 to switch such that the LP/OS 256 instead controls the pressure in the first chamber 204. As the EHSV 252 may only be controlling the pressure in the first chamber 204, it may only have two fluid ports (as opposed to the four ports required in FIGS. 1A-1D).

FIG. 1 shows the actuator 200 operating in a first ("coarse") mode. In this mode, the first and second chambers 204,206 are pressurised with hydraulic fluid such that net force on the second wall 218 of the second chamber 206 (due to the hydraulic fluid) overcomes the biasing force exerted by the spring 214, thereby forcing the second wall 218 to move and compress the spring 214. The second wall 218 may move until it meets the stop member 235. As the locking mechanism 210 is connected to the second wall 218 by the third wall 223, this moves the locking mechanism 210 (and third wall 223) away from the second wall 218 of the first chamber 204. This allows the hydraulic fluid in the first chamber 204 to act on the first wall 205 of the first hydraulic chamber 204. The hydraulic fluid in the second chamber 206 also acts on the first wall 207 of the second chamber 206. The pressures in the first and second chambers 204,206 are such that the first walls 205,207 of the chambers 204,206, and thus the yoke 202, move in the direction from the first chamber 204 to the second chamber 206. The pressure differential between the pressures in the first and second chambers 204,206 may be relatively low, or even zero. For example, the surface area $S_1$ of the first wall 205 of the first chamber 204 acted on by the force causes by the first pressure may be greater than the surface area $S_2$ of the first wall 205 of the second chamber 206 acted on by the force caused by the second pressure, such that even if the pressure differential between the two chambers 204,206 is relatively small or zero, the walls 205,207 exert a net force on the yoke 202 that drives it in a direction from the first chamber 204 to the second chamber 206.

Figure 2:
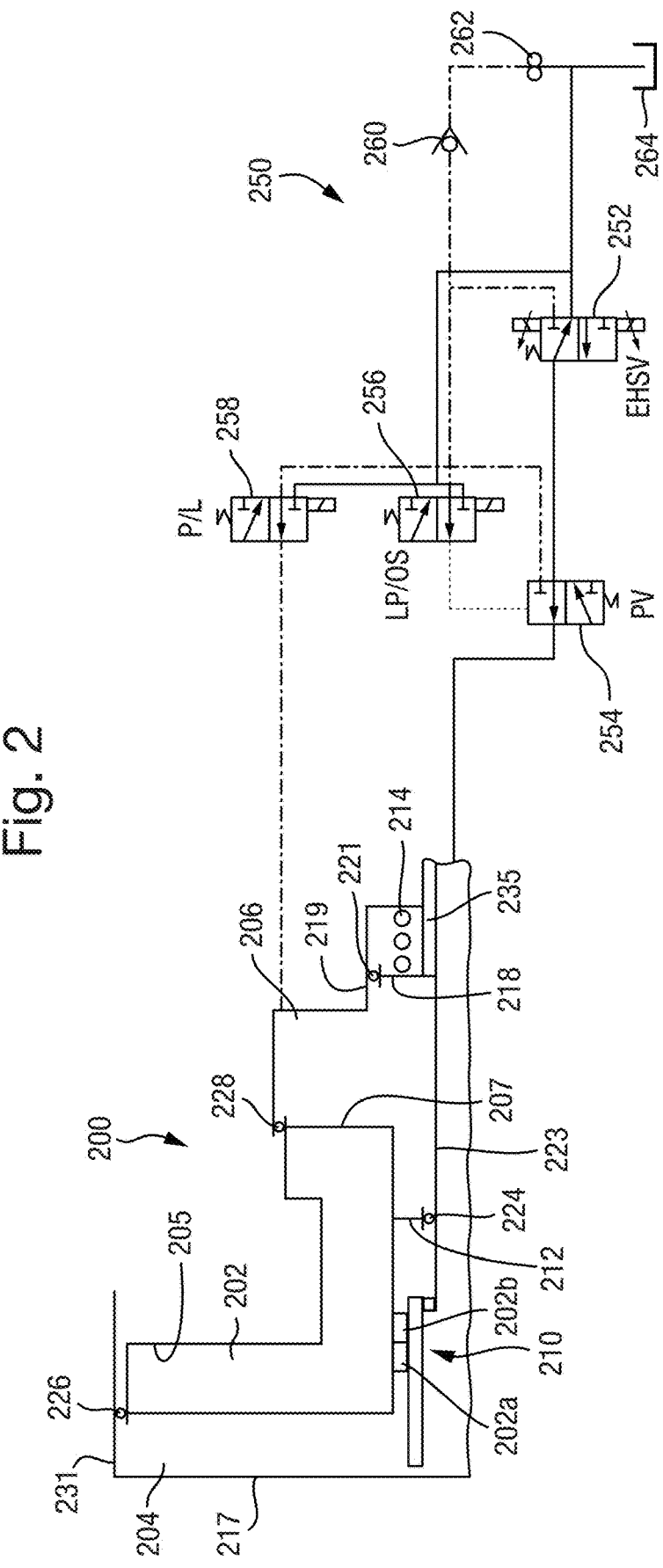
FIG. 2 shows the actuator of FIG. 1 in a "fine" mode.

FIG. 2 shows the actuator 200 in a second ("fine") mode. In this mode, the first and second chambers 204,206 are pressurised with hydraulic fluid such that net force on the second wall 218 of the second chamber 206 (due to the hydraulic fluid) overcomes the biasing force exerted by the spring 214, thereby forcing the wall 218 to move and compress the spring 214. The second wall 218 may move until it meets the stop member 235. As the locking mechanism 210 is connected to the second wall 218 by the third wall 232, this moves the locking mechanism 210 (and third wall 232) away from the second wall 217 of the first chamber 204. This allows the hydraulic fluid in the first chamber 204 to act on the first wall 205 of the first hydraulic chamber 204. The hydraulic fluid in the second chamber 206 also acts on the first wall 207 of the second chamber 206. The pressures in the first and second chambers 204,206 are controlled such that the first walls 205,207 of the chambers 204,206 move the yoke 202 in the direction from the second chamber 204 to the first chamber 206. This may be achieved by maintaining the pressure in the first chamber 204 lower than the pressure in the second chamber 206. For example, the surface area $S_1$ of the first wall 205 of the first chamber 204 acted on by the force caused by the first pressure may be greater than the surface area $S_2$ of the first wall 207 of the second chamber 206 acted on by the force caused by the second pressure, such that the net force exerted on the yoke 202 drives it in a direction from the second chamber 206 to the first chamber 204.

The pressure in the second chamber 206 may be maintained substantially constant between the first and second modes described above, and the position of the yoke 202 may be controlled to move in either direction by the piloting (i.e. the control of the pressure in) only the first chamber 204.

Figure 3:
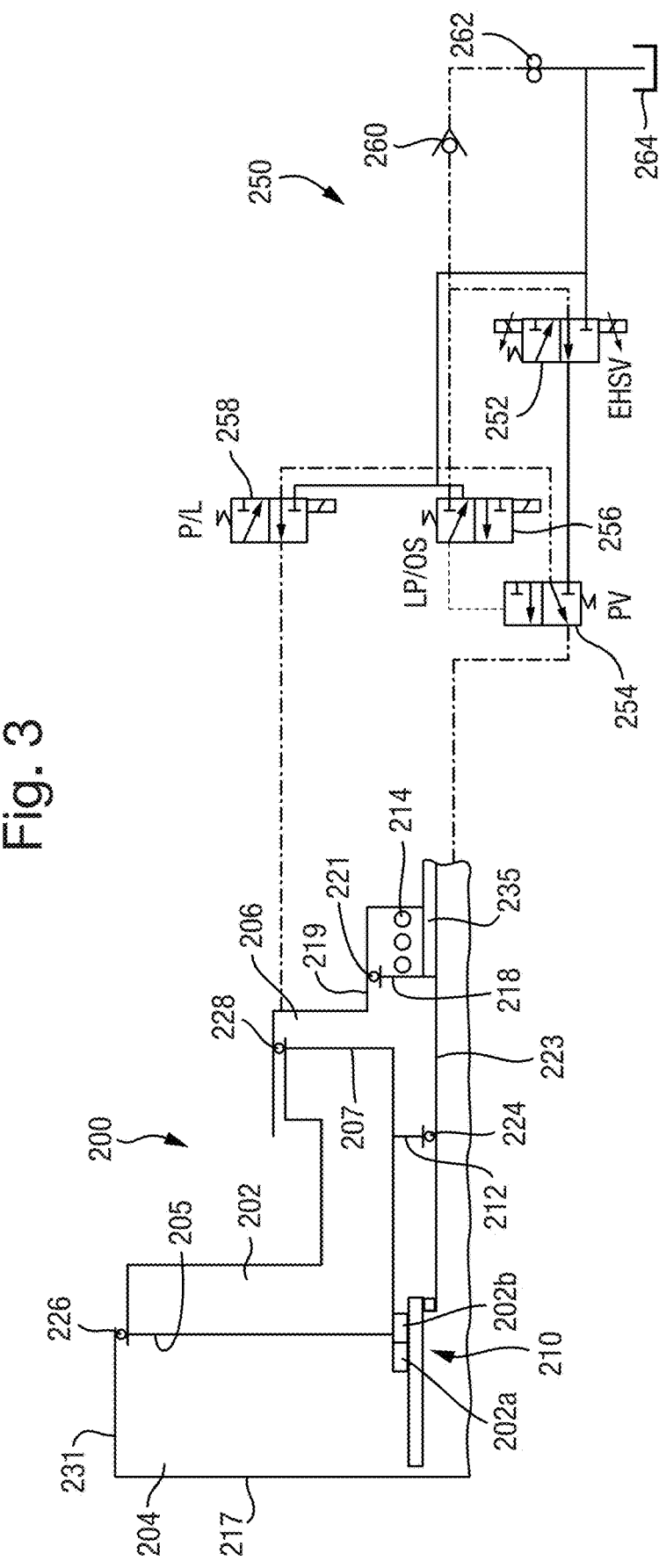
FIG. 3 shows the actuator of FIGS. 1 and 2 in a "feather" mode.

FIG. 3 shows the actuator 200 in a third ("feather") mode. This mode is substantially the same as the first ("coarse") mode described above, except that in the third mode the pressure in the first chamber 204 is controlled by the LP/OS valve 256, rather than the EHSV 252. The direction of movement of the yoke 202 is the same as that in the first ("coarse") mode. However, in the third (feather) mode, a higher cross section can be provided for hydraulic fluid flow through the valves than in the first mode: thus, the speed of the movement of the yoke can be quicker. This allows the actuator to move into the third (feather), which is may be a safety mode, as quickly as possible. For example, in the embodiments wherein the actuator controls the pitch of propeller blades, the third mode (feather/safety mode) may quickly move the yoke 202 to a position in which it moves the pitch of the propeller blades to a safety pitch.

Figure 4:
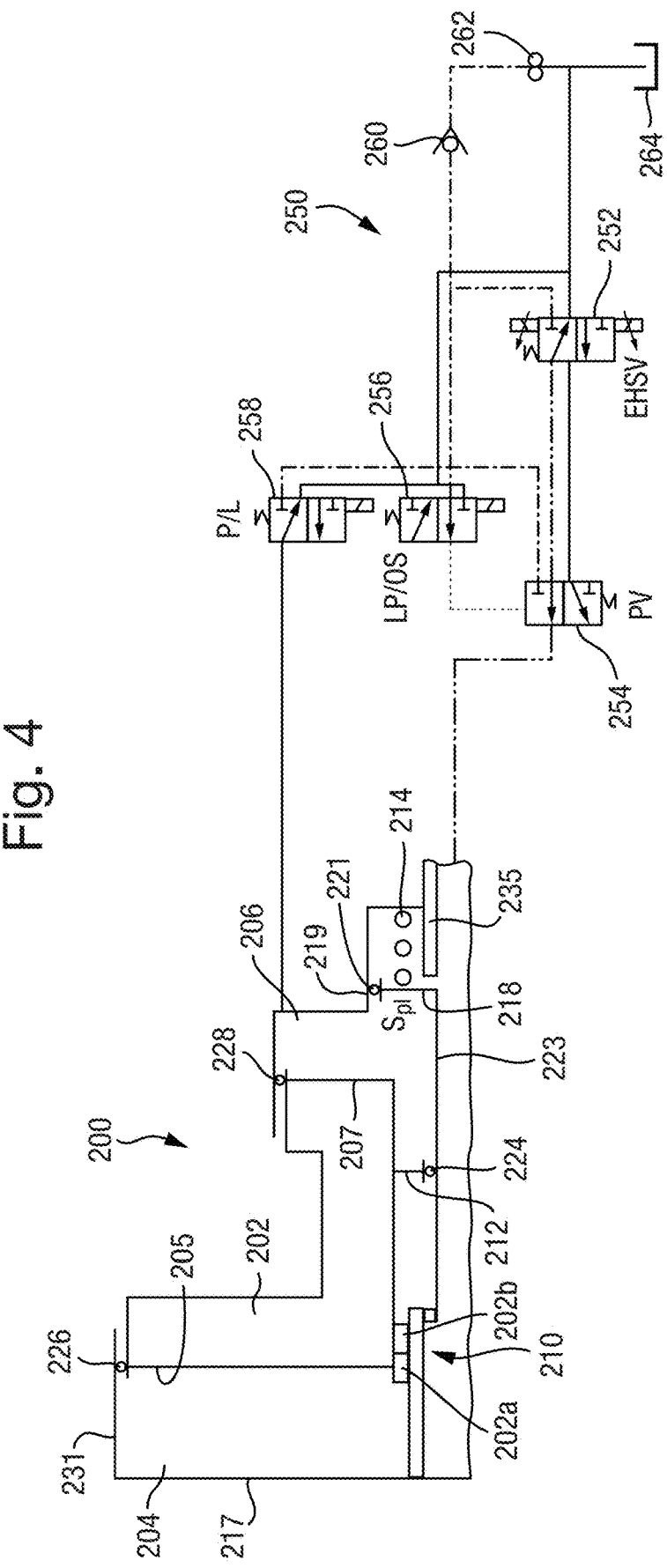
FIG. 4 shows the actuator of FIGS. 1, 2 and 3 in a "pitchlock" mode.

FIG. 4 shows the actuator 200 in a fourth ("pitchlock") mode. In this mode, the first and second chambers 204,206 are pressurised with hydraulic fluid such that net force on the second wall 207 of the second chamber 206 (due to the hydraulic fluid in the first and second chambers 204,206 and the force exerted by the spring 214) is in a direction from the first chamber 204 to the second chamber 206. For example, the pressure in the second chamber 206 may be lower than the pressure in the first chamber 204. The spring 214 therefore expands and the second wall 207 of the second chamber 206 moves towards the first chamber 204. As the locking mechanism 210 is connected to the second wall 218 by the third wall 223, this moves the locking mechanism 210 (and third wall 223) to engage the second wall 217 of the first chamber 204. The contact between the locking mechanism 210 and the second wall 217 of the first chamber causes the locking mechanism 210 to be mechanically locked to the yoke 202 via the yoke members 202a, 202b in at least one direction so as to prevent the yoke 202 from moving in the direction towards the first and/or second hydraulic chamber 204,206. This may prevent the yoke 202 from being moved in a direction from the second chamber 206 towards the first chamber 204 (i.e. leading to an increase in volume of the second chamber 206 and a decrease in volume of the first chamber 204). However, if the pressure in the first chamber 204 is high enough, and the pressure in the second chamber 206 is low enough, the yoke 202 may move in a direction from the first chamber 204 towards the second chamber 206, e.g. using a system similar to that in US 2015/0050149.

In embodiments where the actuator is used to control the pitch of propeller blades, the fourth mode may be referred to as a "pitchlock" mode, which prevents the pitch of the blades from being moved in one direction.

It will therefore be appreciated that embodiments of the present disclosure enable the actuator to be operated in several modes using only two hydraulic chambers, and thus with a simplified hydraulic control system and valves.

Embodiments also allow the use of fewer dynamic seals and/or allow the pressure difference across the seals to act in the same direction, reducing the risk of "blow-by".

Embodiments also reduce the risk of high pressure peaks in the first chamber 204, which may undesirably cause a "pitchlock" mode.

Although the present disclosure has been described with reference to various embodiments, it will be understood by those skilled in the art that various changes in form and detail may be made without departing from the scope of the invention as set forth in the accompanying claims.

For example, it will be appreciated that the hydraulic fluids supplied to the first and second chambers 204,206 may be any suitable hydraulic fluid (i.e. incompressible fluids), and may be the same or different fluids.

The invention claimed is:

1. An actuator comprising:
    a moveable member;
    a first hydraulic chamber in contact with a first surface of the moveable member;
    a second hydraulic chamber in contact with a second, opposing surface of the moveable member;
    a movable locking mechanism coupled to a moveable wall of the second hydraulic chamber; and
    a resilient biasing member acting on the moveable wall of the second hydraulic chamber so as to bias the moveable wall and locking mechanism;
    wherein the actuator is configured to selectively vary the pressure in the second hydraulic chamber so that the resilient biasing member is able to bias the moveable wall to move, thereby moving the locking mechanism such that it engages the movable member so as to prevent the movement of the moveable member towards at least one of the first and second hydraulic chambers.

2. The actuator of claim 1, wherein the movable wall is on an opposing side of the second hydraulic chamber to the second, opposing surface of the moveable member.

3. The actuator of claim 1, wherein the resilient biasing member is located outside of the second hydraulic chamber.

4. The actuator of claim 1 wherein the resilient biasing member is a spring.

5. The actuator of claim 1, wherein the movable locking mechanism is located in the first hydraulic chamber and said moving the locking mechanism moves the locking mechanism into engagement with a wall of the first hydraulic chamber.

6. The actuator of claim 1, wherein the locking mechanism is configured such that, when it engages with the moveable member so as to prevent the movement of the moveable member, it prevents the movement of the moveable member towards the first hydraulic chamber.

7. The actuator of claim 1, comprising a control system for controlling the pressure supplied to the first and second hydraulic chambers, wherein the control system is configured to pressurise the first and second hydraulic chambers such that, in one mode, this moves the movable wall to compress the resilient biasing member and to move the locking mechanism to allow the movement of the moveable member; and
    wherein the control system is configured to pressurise the first and second hydraulic chambers such that, in one mode, the resilient biasing member is able to expand and moves the locking mechanism to prevent the movement of the moveable member.

8. The actuator of claim 7, wherein the control system is configured such that, in said one mode, the pressure in the second hydraulic chamber is maintained substantially constant and the pressure in the first hydraulic chamber is varied so as to cause the movable member to move.

9. The actuator of claim 1, comprising a control system for controlling the pressure supplied to the first and second hydraulic chambers, wherein the control system is configured to pressurise the first and second hydraulic chambers such that, in one mode, this moves the movable wall to compress the resilient biasing member and to move the locking mechanism to allow the movement of the moveable member.

10. The actuator of claim 9, wherein the control system is configured such that, in said one mode, the pressure in the second hydraulic chamber is maintained substantially constant and the pressure in the first hydraulic chamber is varied so as to cause the movable member to move.

11. The actuator of claim 1, comprising a control system for controlling the pressure supplied to the first and second hydraulic chambers, wherein the control system is configured to pressurise the first and second hydraulic chambers such that, in one mode, the resilient biasing member is able to expand and moves the locking mechanism to prevent the movement of the moveable member.

12. The actuator of claim 1, comprising a control system for controlling the pressure supplied to the first and second hydraulic chambers, wherein the control system is configured to pressurise the first and second hydraulic chambers such that, in one mode, the pressurised first and second hydraulic chambers cause the movable member to move.

13. A propeller system comprising:
    one or more propeller blades; and
    an actuator as recited in claim 1;
    wherein the actuator is coupled to the one or more propeller blades such that movement of said movable member alters the pitch of the one or more propeller blades.

14. An actuator comprising:
    a moveable member;
    a first hydraulic chamber in contact with a first surface of the moveable member;
    a second hydraulic chamber in contact with a second, opposing surface of the moveable member;
    a movable locking mechanism coupled to a moveable wall of the second hydraulic chamber; and
    a resilient biasing member acting on the moveable wall of the second hydraulic chamber so as to bias the moveable wall and locking mechanism;
    wherein the actuator is configured to selectively vary the pressure in the second hydraulic chamber so that the resilient biasing member is able to bias the moveable wall to move, thereby moving the locking mechanism such that it engages the movable member so as to prevent the movement of the moveable member towards at least one of the first and second hydraulic chambers;
    wherein the movable wall is on an opposing side of the second hydraulic chamber to the second, opposing surface of the moveable member; and
    wherein the first hydraulic chamber is arranged to contact the movable wall, such that the movable wall separates the first and second hydraulic chambers.

15. The actuator of claim 14, wherein the resilient biasing member is located inside the first hydraulic chamber.

* * * * *